(12) United States Patent
Jacobs et al.

(10) Patent No.: US 10,102,487 B2
(45) Date of Patent: Oct. 16, 2018

(54) RESERVE FORECASTING SYSTEMS AND METHODS FOR AIRLINE CREW PLANNING AND STAFFING

(71) Applicant: American Airlines, Inc., Fort Worth, TX (US)

(72) Inventors: Timothy L. Jacobs, Tempe, AZ (US); Sumit Batra, Edina, MN (US); Hadi Purnomo, Phoenix, AZ (US); Kathleen Dege, Mesa, AZ (US); Markus A. Wegner, Phoenix, AZ (US); JonCarlo Gulbranson, Scottsdale, AZ (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 231 days.

(21) Appl. No.: 13/793,049

(22) Filed: Mar. 11, 2013

(65) Prior Publication Data
US 2014/0257900 A1    Sep. 11, 2014

(51) Int. Cl.
G06Q 10/00     (2012.01)
G06Q 10/06     (2012.01)

(52) U.S. Cl.
CPC ............................ *G06Q 10/063116* (2013.01)

(58) Field of Classification Search
USPC ................................................ 705/7.11–7.42
See application file for complete search history.

(56) References Cited

U.S. PATENT DOCUMENTS

| | | | |
|---|---|---|---|
| 6,134,500 A | 10/2000 | Tang et al. | |
| 6,580,990 B2 | 6/2003 | Wager et al. | |
| 7,705,968 B2 | 4/2010 | Nagasaka et al. | |
| 8,700,440 B1 | 4/2014 | Ande et al. | |
| 2005/0137925 A1* | 6/2005 | Lakritz | G06Q 10/06 705/7.22 |
| 2007/0219637 A1* | 9/2007 | Berelsman | A61F 2/4081 623/19.11 |
| 2007/0219837 A1* | 9/2007 | Lu | G06Q 10/0635 705/7.28 |
| 2009/0240517 A1 | 9/2009 | Pelter | |
| 2011/0131075 A1* | 6/2011 | Robertson | G06Q 10/04 705/7.25 |
| 2011/0202382 A1* | 8/2011 | Santos | G06Q 10/06 705/7.17 |
| 2012/0109700 A1* | 5/2012 | Cook | G06Q 10/06311 705/7.13 |

(Continued)

OTHER PUBLICATIONS

A.T. Ernst et al., Staff scheduling and rostering: A review of applications, methods and models, Elsevier B.V., Pub. date 2004.*

(Continued)

*Primary Examiner* — Jamie H Austin
*Assistant Examiner* — Allison M Robinson
(74) *Attorney, Agent, or Firm* — Snell & Wilmer L.L.P.

(57) ABSTRACT

A crew planning system includes a demand forecasting module and an optimization module. The system forecasts anticipated reserve demand levels, and determines suitable reserve staffing approaches to meet anticipated reserve demand. The forecasting is based upon probabilistic distribution models which take into account variability associated with reserve demand for a particular day. Via use of the crew planning system, reserve staffing expenses may be reduced and/or reserve demand may be met with a higher degree of probability.

16 Claims, 10 Drawing Sheets

(56) References Cited

U.S. PATENT DOCUMENTS

| | | |
|---|---|---|
| 2012/0130760 A1* | 5/2012 | Shan .................. G06Q 10/00 705/7.12 |
| 2012/0185353 A1 | 7/2012 | Goel |
| 2013/0046422 A1 | 2/2013 | Cabos |
| 2013/0144517 A1 | 6/2013 | Kickbusch |
| 2013/0261956 A1 | 10/2013 | Marks |

OTHER PUBLICATIONS

Sohoni et al., Operation Airline Reserve Crew Planning, 2006, Springer Science + Business Media, 9:203-221.*
Sohoni et al., Operation Airline Reserve Crew Planning, 2006, Springer Science + Business Media, 9:203-221 (Year: 2006).*
Office Action dated Sep. 5, 2014 in U.S. Appl. No. 13/966,723.

* cited by examiner

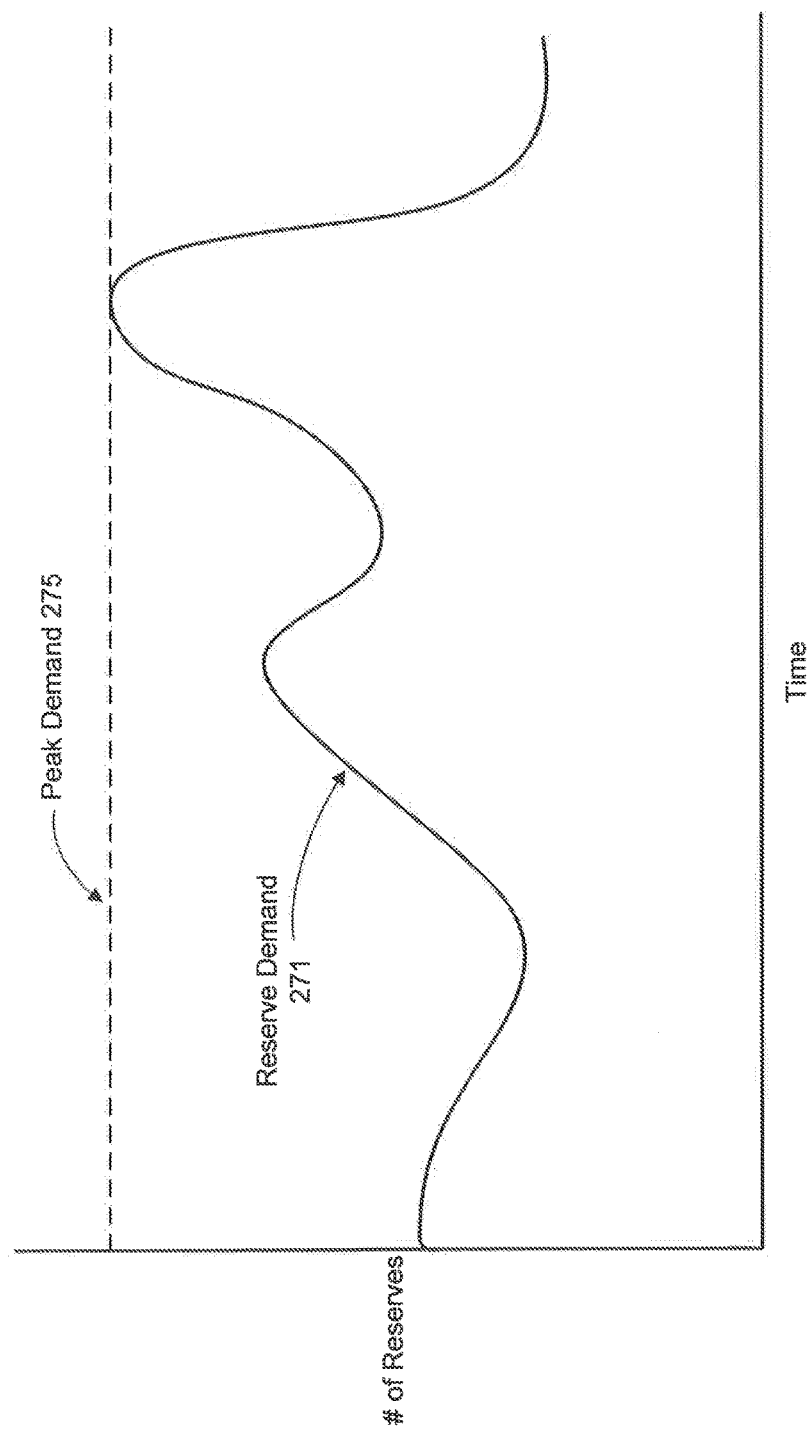

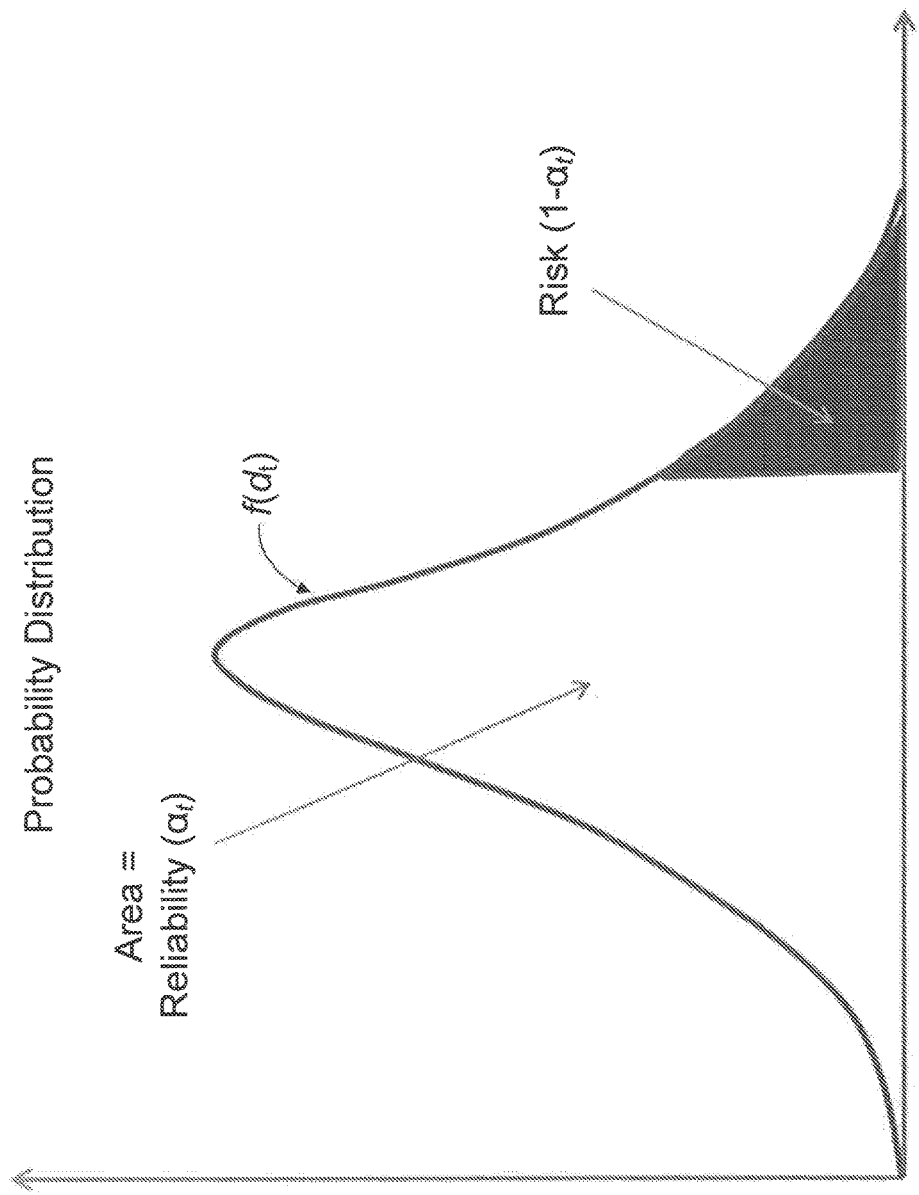

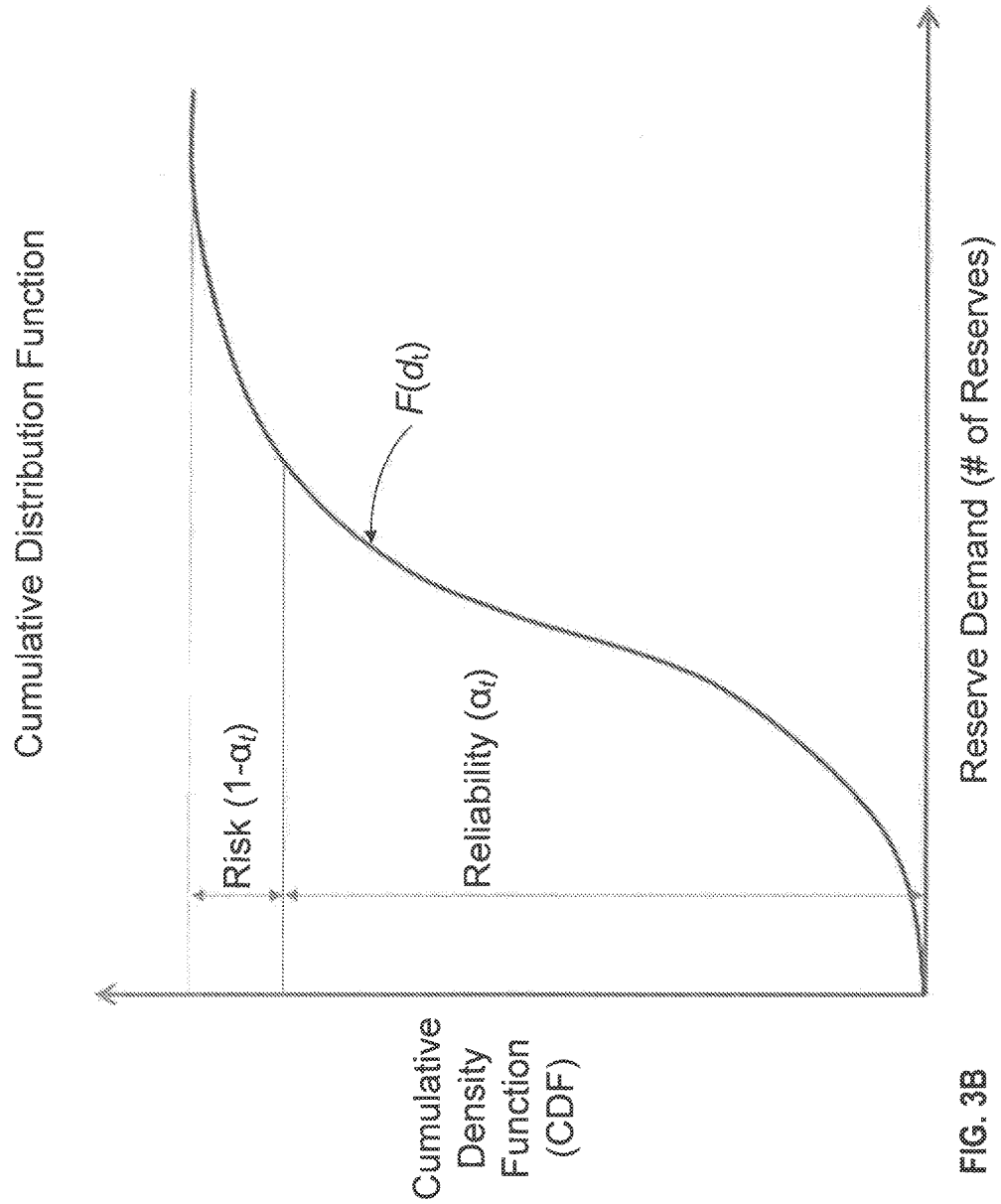

US 10,102,487 B2

RESERVE FORECASTING SYSTEMS AND METHODS FOR AIRLINE CREW PLANNING AND STAFFING

TECHNICAL FIELD

The present disclosure generally relates to forecasting, and more particularly, to analysis methods and tools suitable for use in crew planning and staffing.

BACKGROUND

Today, airlines and other human-resource intensive businesses face costly challenges associated with crew shortfalls. These shortfalls can result from factors such as schedule disruptions, unusually high sick calls, etc. When an airline falls short of crew reserves to cover crew absences, the airline often must cancel the flights, resulting in significant cost to the airline and inconvenience to the passengers. On the other hand, crew reserves are a significant expense for an enterprise. Accordingly, improved approaches for crew planning, reserve forecasting, and/or the like remain desirable.

SUMMARY

In an embodiment, a method comprises: forecasting, by a processor for crew planning, a daily reserve demand level for each day in a first time period; optimizing, by the processor, a reserve staffing model to generate a reserve staffing level for each day in the first time period; and evaluating, by the processor, the result of the reserve staffing model for each day in the first time period to determine reserve staffing results information.

In another embodiment, a non-transitory computer-readable storage medium has computer-executable instructions stored thereon that, in response to execution by a processor for crew planning, cause the processor to perform operations comprising: forecasting, by the processor, a daily reserve demand level for each day in a first time period; optimizing, by the processor, a reserve staffing model to generate a reserve staffing level for each day in the first time period; and evaluating, by the processor, the result of the reserve staffing model for each day in the first time period to determine reserve staffing results information.

BRIEF DESCRIPTION OF THE DRAWINGS

With reference to the following description, appended claims, and accompanying drawings:

FIG. 2A illustrates an exemplary graph of reserve demand, in accordance with various embodiments;

FIG. 3A illustrates an exemplary probability distribution, in accordance with various embodiments;

FIG. 3B illustrates an exemplary cumulative distribution function, in accordance with various embodiments.

DETAILED DESCRIPTION

Figure 1:
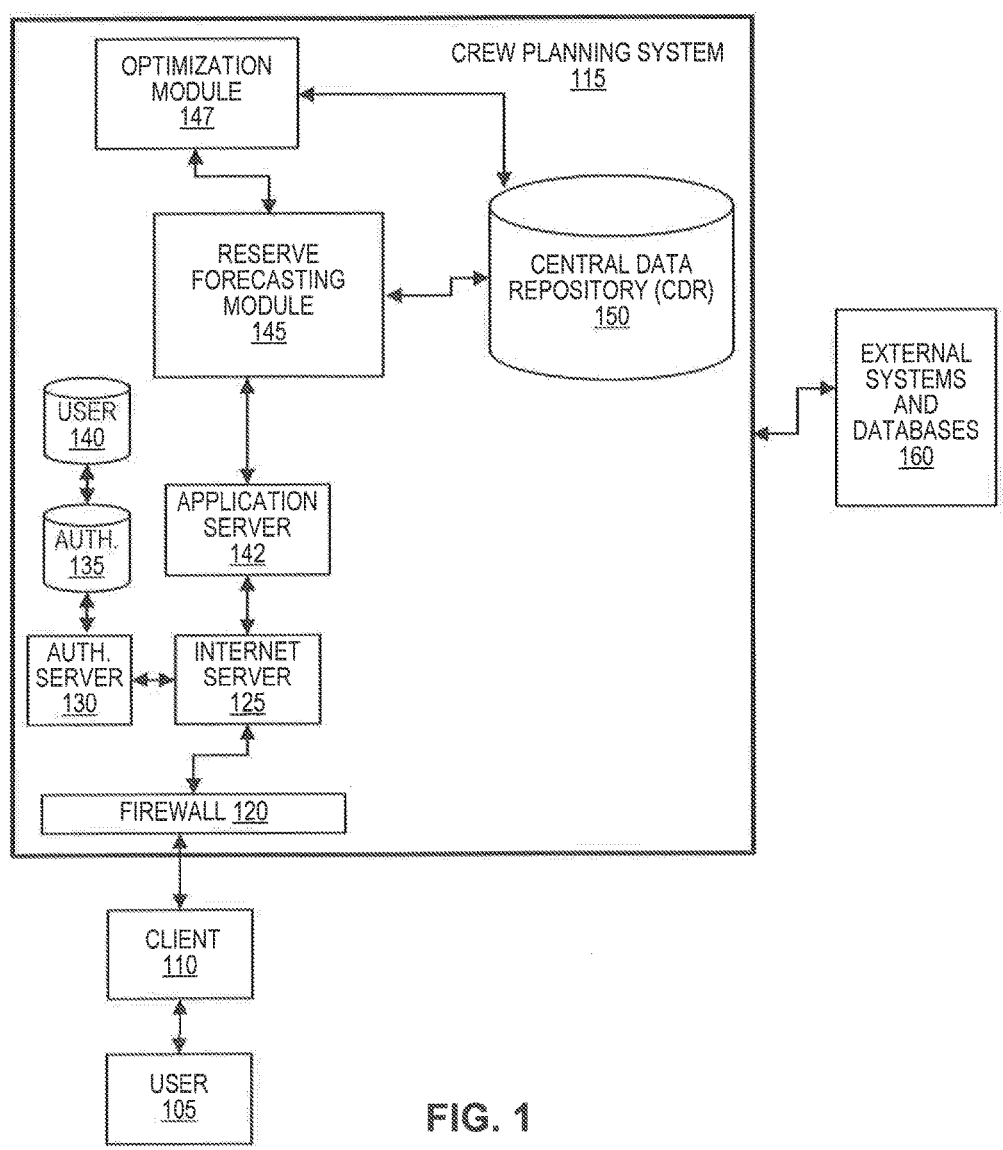
FIG. 1 is a block diagram illustrating exemplary crew planning system components, in accordance with various embodiments.

The following description is of various embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure or appended claims.

For the sake of brevity, conventional techniques for data management, computer networking, software application development, forecasting, crew planning, operations management, statistical analysis, and other aspects of exemplary systems and methods (and components thereof) and/or the like, may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical crew planning system.

Airlines continually face challenges associated with the efficient planning, scheduling and utilization of their flight and cabin crews. In addition to regular line-holders (i.e., crew members scheduled to work on a particular date), many airlines maintain significant reserve staffing levels to cover unplanned sick employees and no-shows, meet contractual obligations, and operate smoothly. When an airline does not have sufficient reserves to cover the crew absences, the airline usually must cancel flights, at significant cost to the airline and inconvenience to the passengers.

Prior approaches to reserve staffing employed only deterministic approximations to estimate and plan for reserve crew staffing levels. Such estimates typically use static multipliers based on peak line-holder crew requirements to set reserve crew levels. For example, most carriers use historical peak reserve usage to calibrate the multipliers used to set reserve staffing levels. As a result, most carriers treat the reserve crew planning and scheduling problem as a deterministic problem that simply represents a safety margin over the number of line holders needed to operate the published flight schedule.

In general, most carriers today approach crew pairing, planning and scheduling as a deterministic process due to the fact that they assume a fixed planned flight schedule. This assumption is reasonable, given that this process focuses on the creation and publications of crew rosters or bidlines for the bidding process by pilots and flight attendants. However, this approach is also limited and incomplete.

Typical crew planning processes in the airline industry take one of two popular forms: 1) a standard bidline process, or 2) preferential bidding. A standard bidline schedule represents a process in which crew (for example, pilots and flight attendants) bid on contractually feasible bidlines based on seniority. In contrast, preferential bidding allows individual crew members (either pilots or flight attendants) to influence their flight schedules by submitting personal preferences associated with their desired work schedule as inputs to the bidline generation process. Using these preferences, the airline builds bidlines that try to meet these preferences and generates monthly work/flight schedules for each line holder required to cover the flight schedule.

In contrast, features of the present disclosure can reshape the way organizations plan for and/or allocate human resources, for example airline crew members. Prior approaches to crew planning, for example approaches to reserve forecasting, may generate excessive reserve levels (i.e., more reserves are provided than are needed), leading to unnecessary costs. Prior approaches can also lead to insufficient reserve levels, leading to cancelled flights, reduced revenue, and ill-will toward the airline.

In accordance with principles of the present disclosure, crew planning systems and methods enable improved reserve demand forecasting. In various embodiments, rather than applying a simple deterministic approach, exemplary crew planning systems and methods are configured to incorporate probabilistic metrics of risk. For example, in various embodiments, a crew planning system incorporates probabilistic metrics of risk selected by airline crew planning personnel.

While the present disclosure discusses airlines, flights, pilots, flight attendants, and so forth for purposes of convenience and illustration, one of skill in the art will appreciate that the forecasting methods, systems, and tools disclosed herein are broadly applicable, for example to any transportation industry, such as buses, cruise ships, passenger trains, and the like, and more generally to any industry wherein contingency staffing is applied.

Various embodiments of principles of the present disclosure employ forecasting, statistical analysis and/or optimization techniques. For more information regarding such techniques refer to, for example: "The Theory and Practice of Revenue Management" (International Series in Operations Research & Management Science) by Kalyan T. Talluri and Garrett J. van Ryzin; "Using Multivariate Statistics (5th Edition)" by Barbara G. Tabachnick and Linda S. Fidell; and "Introduction to Operations Research" by Friedrich S. Hiller and Gerald J. Lieberman, McGraw-Hill 7th edition, Mar. 22, 2002; the contents of which are each hereby incorporated by reference in their entireties.

In various embodiments, exemplary crew planning systems include a user interface ("UI"), software modules, logic engines, various databases, interfaces to systems and tools, and/or computer networks. While exemplary crew planning system's may contemplate upgrades or reconfigurations of existing processing systems, changes to existing databases and system tools are not necessarily required by principles of the present disclosure.

The benefits provided by principles of the present disclosure include, for example, reduced flight cancellations, increased forecasting accuracy, improved characterization of staffing risks, lower payroll costs, increased employee utilization, increased customer good will, increased planning and operational efficiency, increased employee morale, and the like. For example, a crew planning organization benefits from improved forecasting accuracy and resulting decreased payroll expenses. Customers benefit from reduced flight cancellations arising from insufficient crew reserves.

As used herein, an "entity" may include any individual, software program, business, organization, government entity, web site, system, hardware, and/or any other entity. A "user" may include any entity that interacts with a system and/or participates in a process.

Turning now to FIG. 1, in accordance with various embodiments, a user 105 may perform tasks such as requesting, retrieving, receiving, updating, analyzing and/or modifying data. User 105 may also perform tasks such as initiating, manipulating, interacting with or using a software application, tool, module or hardware, and initiating, receiving or sending a communication. User 105 may interface with Internet server 125 via any communication protocol, device or method discussed herein, known in the art, or later developed. User 105 may be, for example, a member of a crew planning organization, a member of an operations research or systems analysis organization, a downstream system, an upstream system, a third-party system, a system administrator, and/or the like.

In various embodiments, a system 101 may include a user 105 interfacing with a crew planning system 115 by way of a client 110. Crew planning system 115 may be a partially or fully integrated system comprised of various subsystems, modules and databases. Client 110 comprises any hardware and/or software suitably configured to facilitate entering, accessing, requesting, retrieving, updating, analyzing and/or modifying data. The data may include operational data (e.g., schedules, resources, routes, operational alerts, weather, etc.), human resource data (for example, on-duty and off-duty days for pilots and flight attendants), passenger data, cost data, forecasts, historical data, verification data, asset (e.g., airplane) data, inventory (e.g., airplane seat) data, legal/regulatory data, authentication data, demographic data, transaction data, or any other suitable information discussed herein.

Client 110 includes any device (e.g., a computer), which communicates, in any manner discussed herein, with crew planning system 115 via any network or protocol discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand-held computers, portable computers, kiosks, and/or the like. Practitioners will appreciate that client 110 may or may not be in direct contact with crew planning system 115. For example, client 110 may access the services of crew planning system 115 through another server, which may have a direct or indirect connection to Internet server 125. Practitioners will further recognize that client 110 may present interfaces associated with a software application (e.g., SAS analytic software) or module that are provided to client 110 via application graphical user interfaces (GUIs) or other interfaces and are not necessarily associated with or dependent upon Internet browsers or internet specific protocols.

User 105 may communicate with crew planning system 115 through a firewall 120, for example to help ensure the integrity of crew planning system 115 components. Internet server 125 may include any hardware and/or software suitably configured to facilitate communications between the client 110 and one or more crew planning system 115 components.

Firewall 120, as used herein, may comprise any hardware and/or software suitably configured to protect crew planning system 115 components from users of other networks. Firewall 120 may reside in varying configurations including stateful inspection, proxy based and packet filtering, among others. Firewall 120 may be integrated as software within Internet server 125, any other system 101 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to predefined privileges associated with the credentials. Authentication server 130 may grant varying degrees of application and/or data level access to users based on information stored within authentication database 135 and user database 140. Application server 142 may include any hardware and/or software suitably configured to serve applications and data to a connected client 110.

In accordance with various embodiments, crew planning system 115 is usable to forecast reserve crew demand, manage crew staffing strategy, evaluate risk associated with a particular crew staffing strategy, generate inputs to other forecasting systems, and/or the like. Continuing to reference FIG. 1, crew planning system 115 allows communication with central data repository (CDR) 150, and with various other databases, tools, UIs and systems, for example external systems and databases 160. Such systems include, for example, airline scheduling systems, passenger booking and reservations systems, human resource systems, revenue management systems, inventory systems, and/or the like.

Crew planning system 115 components may be interconnected and communicate with one another to allow for a completely integrated crew planning system. In various embodiments, crew planning system 115 formulates reserve demand forecast models and associated expense and/or revenue consequences at the flight level, day level, etc. Crew scheduling systems may generate bidlines and/or otherwise make staffing decisions based at least in part upon the output of crew planning system 115.

In various embodiments, crew planning system 115 modules (e.g., reserve forecasting module 145 and/or optimization module 147) are software modules configured to enable online functions such as sending and receiving messages, receiving query requests, configuring responses, dynamically configuring user interfaces, requesting data, receiving data, displaying data, executing complex processes, calculations, forecasts, mathematical techniques, workflows and/or algorithms, prompting user 105, verifying user responses, authenticating the user, initiating crew planning system 115 processes, initiating other software modules, triggering downstream systems and processes, encrypting and decrypting, and/or the like. Additionally, crew planning system 115 modules may include any hardware and/or software suitably configured to receive requests from client 110 via Internet server 125 and application server 142.

Crew planning system 115 modules may be further configured to process requests, execute transactions, construct database queries, and/or execute queries against databases within system 101 (e.g., central data repository ("CDR") 150), external data sources and/or temporary databases. In various embodiments, one or more crew planning system 115 modules may be configured to execute application programming interfaces in order to communicate with a variety of messaging platforms, such as email systems, wireless communications systems, mobile communications systems, multimedia messaging service ("MMS") systems, short messaging service ("SMS") systems, and the like.

Crew planning system 115 modules may be configured to exchange data with other systems and application modules, for example, a scheduling system that generates monthly work/flight schedules for line holders in order to cover a particular airline flight schedule, a flight schedule system, a crew bid system, and/or the like. In various embodiments, crew planning system 115 modules may be configured to interact with other system 101 components to perform complex calculations, retrieve additional data, format data into reports, create XML representations of data, construct markup language documents, construct, define or control UIs, and/or the like. Moreover, crew planning system 115 modules may reside as standalone systems or tools or may be incorporated with the application server 142 or any other crew planning system 115 component as program code. As one of ordinary skill in the art will appreciate, crew planning system 115 modules may be logically or physically divided into various subcomponents, such as a workflow engine configured to evaluate predefined rules and to automate processes.

In addition to the components described above, crew planning system 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; a plurality of databases, and/or the like.

As will be appreciated by one of ordinary skill in the art, one or more system 101 components may be embodied as a customization of an existing system, an add-on product, upgraded software, a stand-alone system (e.g., kiosk), a distributed system, a method, a data processing system, a device for data processing, and/or a computer program product. Accordingly, individual system 101 components may take the form of an entirely software embodiment, an entirely hardware embodiment, or an embodiment combining aspects of both software and hardware. Furthermore, individual system 101 components may take the form of a computer program product on a computer-readable storage medium having computer-readable program code means embodied in the storage medium. Any suitable computer-readable storage medium may be utilized, including magnetic storage devices (e.g., hard disks), optical storage devices, (e.g., DVD-ROM, CD-ROM, etc.), electronic storage devices (e.g., flash memory), and/or the like.

Client 110 may include an operating system (e.g., Windows, UNIX, Linux, Solaris, MacOS, iOS, Android, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package. Client 110 and crew planning system 115 components may be independently, separately or collectively suitably coupled to the network via data links which include, for example, a connection to an Internet Service Provider (ISP) over the local loop as is typically used in connection with standard wireless communications networks and/or methods, such as modem communication, cable modem, satellite networks, ISDN, digital subscriber line (DSL), and/or the like. In various embodiments, any portion of client 110 may be partially or fully connected to a network using a wired ("hard wire") connection. As those skilled in the art will appreciate, client 110 and/or any of the system components may include wired and/or wireless portions.

In various embodiments, components, modules, and/or engines of crew planning system 115 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Internet server 125 may be configured to transmit data to client 110 within markup language documents. "Data" may include encompassing information such as commands, messages, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users (such as user 105). In various embodiments, Microsoft Internet Information Server (IIS), Microsoft Transaction Server (MTS), and Microsoft SQL Server, are used in conjunction with a Microsoft operating system, Microsoft NT web server software, a Microsoft SQL Server database system, and a Microsoft Commerce Server. In various embodiments, the well-known "LAMP" stack (Linux, Apache, MySQL, and PHP/Perl/Python) are used to enable crew planning system 115. Additionally, components such as Access or Microsoft SQL Server, Oracle, Sybase, InterBase, etc., may be used to provide an Active Data Object (ADO) compliant database management system.

Like Internet server 125, application server 142 may communicate with any number of other servers, databases and/or components through any means known in the art. Further, application server 142 may serve as a conduit between client 110 and the various systems and components of crew planning system 115. Internet server 125 may interface with application server 142 through any means known in the art including a LAN/WAN, for example. Application server 142 may further invoke software modules, such as reserve forecasting module 145, automatically or in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A server may include a web service that receives a request from a web server, the request including a URL (e.g., http://yahoo.com/) and/or an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

Continuing to reference FIG. 1, illustrated are databases that are included in various embodiments. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within system 101 may represent multiple hardware, software, database, data structure and networking components. Furthermore, embodiments are not limited to the databases described herein, nor do embodiments necessarily utilize each of the disclosed databases.

Authentication database 135 may store information used in the authentication process such as, for example, user identifiers, passwords, access privileges, user preferences, user statistics, and the like. User database 140 maintains user information and credentials for crew planning system 115 users (e.g., user 105).

In various embodiments, CDR 150 is a data repository that may be configured to store a wide variety of comprehensive data for crew planning system 115. While depicted as a single logical entity in FIG. 1, those of skill in the art will appreciate that CDR 150 may, in various embodiments, consist of multiple physical and/or logical data sources. In various embodiments, CDR 150 stores operational data, schedules, resource data, asset data, inventory data, personnel information, routes and route plans, station (e.g., airports or other terminals) data, operational alert data, weather information, passenger data, reservation data, cost data, optimization results, booking class data, forecasts, historical data, verification data authentication data, demographic data, legal data, regulatory data, transaction data, security profiles, access rules, content analysis rules, audit records, predefined rules, process definitions, financial data, and the like. For example, a data source or component database of CDR 150 includes, but is not limited to: historical line holder crew usage and assignments by (i) base, (ii) equipment, and (iii) seat (for example, position information such as Captain or First Officer); historical reserve crew staffing levels and usage by (i) base, (ii), equipment, and (iii) seat; historical crew and reserve crew sick calls and/or no-shows; pilot status change (PSC) levels (for example, for long term disability); new hire information; retirement information; short-call reserve levels; long-call reserve levels; training times for crew members; vacation information; and/or the like.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GIMP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C++, C#, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system may employ any number of conventional techniques for data transmission, signaling, data processing, network control, and the like. Still further, the system may be used to detect or prevent security issues with a client-side scripting language, such as JavaScript, VBScript or the like.

Software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

With continued reference to FIG. 1, in various embodiments, user 105 logs onto an application (e.g., a module) and Internet server 125 may invoke an application server 142. Application server 142 invokes logic in the crew planning system 115 modules by passing parameters relating to user's 105 requests for data. Crew planning system 115 manages requests for data from crew planning system 115 modules and/or communicates with system 101 components. Transmissions between user 105 and Internet server 125 may pass through a firewall 120 to help ensure the integrity of crew planning system 115 components. Practitioners will appreciate that exemplary embodiments may incorporate any number of security schemes or none at all. In various embodiments, Internet server 125 receives requests from client 110 and interacts with various other system 101 components to perform tasks related to requests from client 110.

Internet server 125 may invoke an authentication server 130 to verify the identity of user 105 and assign roles, access rights and/or permissions to user 105. In order to control access to the application server 142 or any other component of crew planning system 115, Internet server 125 may invoke an authentication server 130 in response to user 105 submissions of authentication credentials received at Internet server 125. In response to request to access system 101 being received from Internet server 125, Internet server 125 determines if authentication is required and transmits a prompt to client 110. User 105 enters authentication data at client 110, which transmits the authentication data to Internet server 125. Internet server 125 passes the authentication data to authentication server 142 which queries the user database 140 for corresponding credentials. In response to user 105 being authenticated, user 105 may access various applications and their corresponding data sources.

Figure 2B:
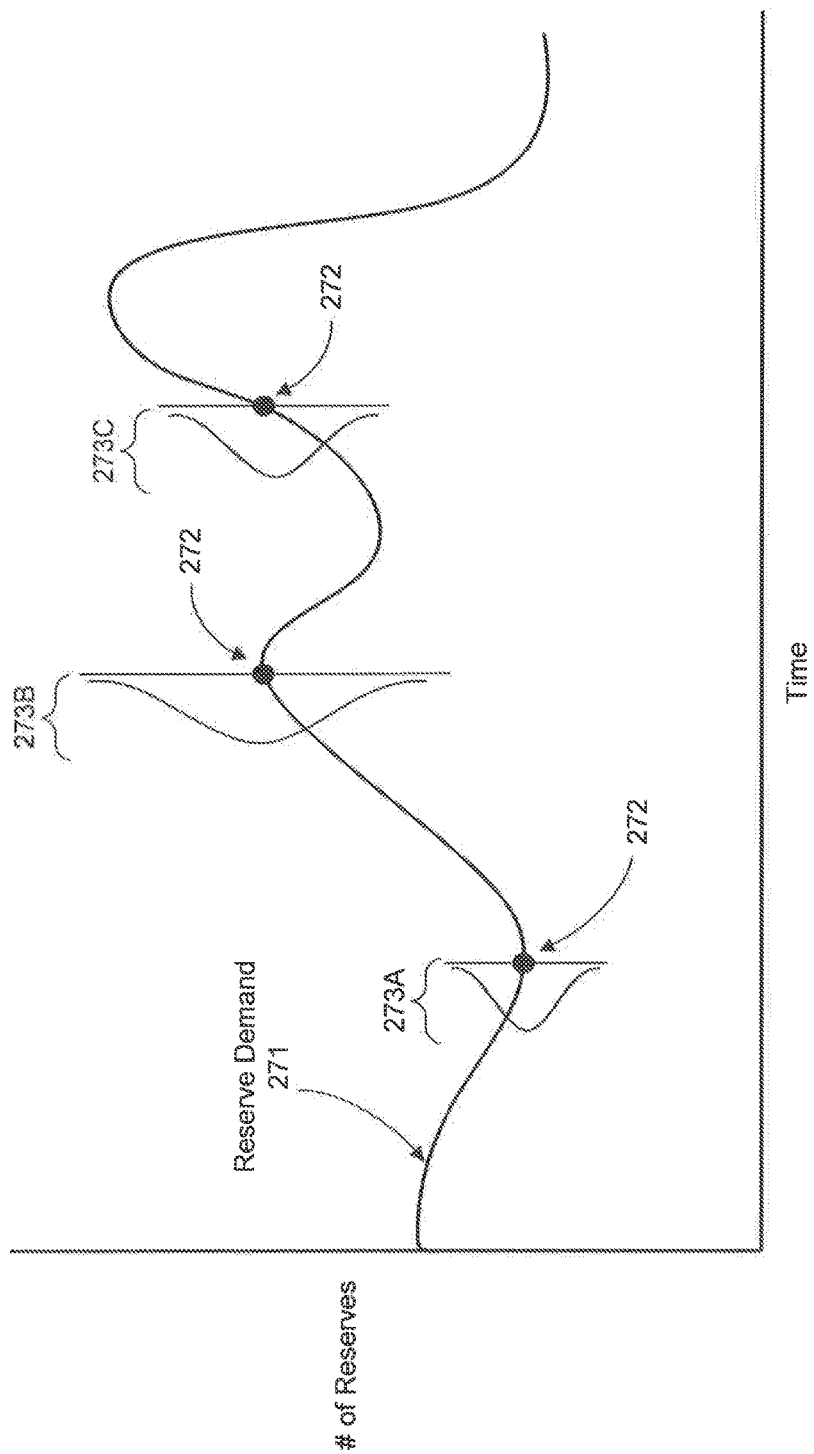
FIG. 2B illustrates an exemplary graph of reserve demand, reflecting statistical distribution of reserve demand on a daily basis, in accordance with various embodiments.
Figure 2C:
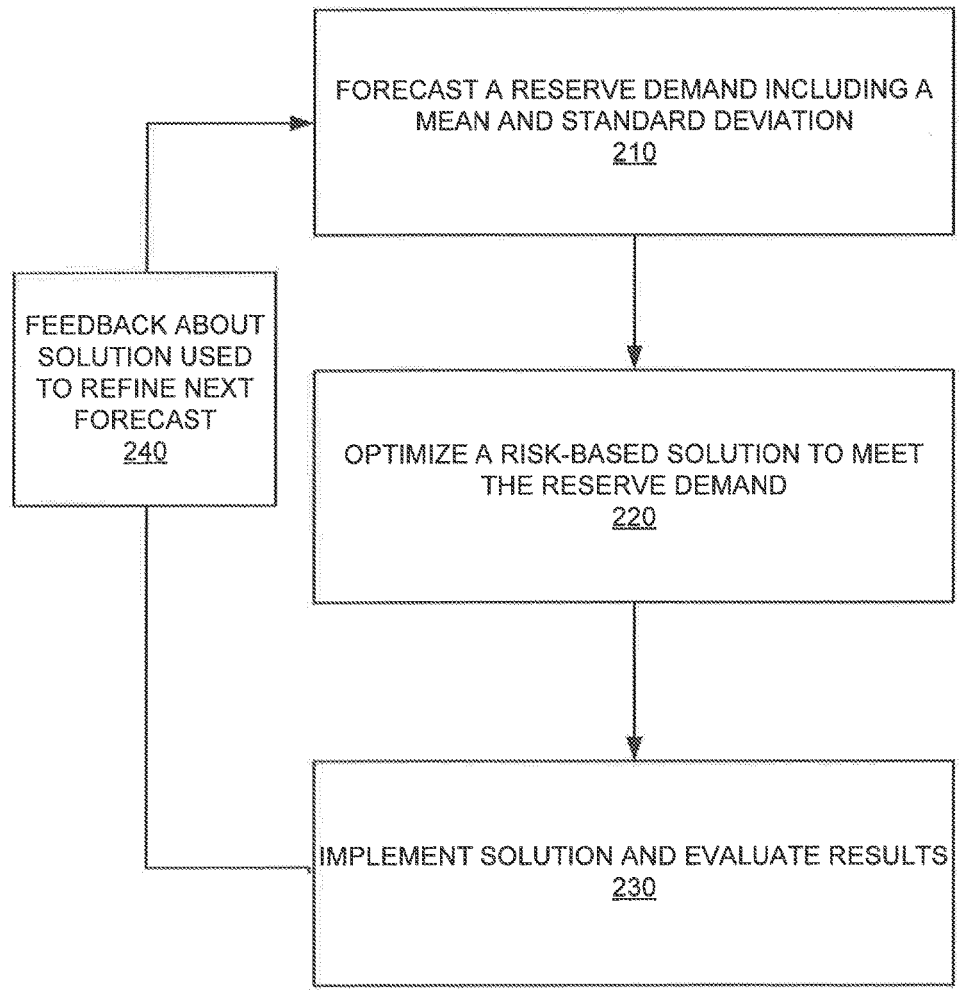
FIG. 2C illustrates an exemplary method for crew planning, in accordance with various embodiments.
Figure 2D:
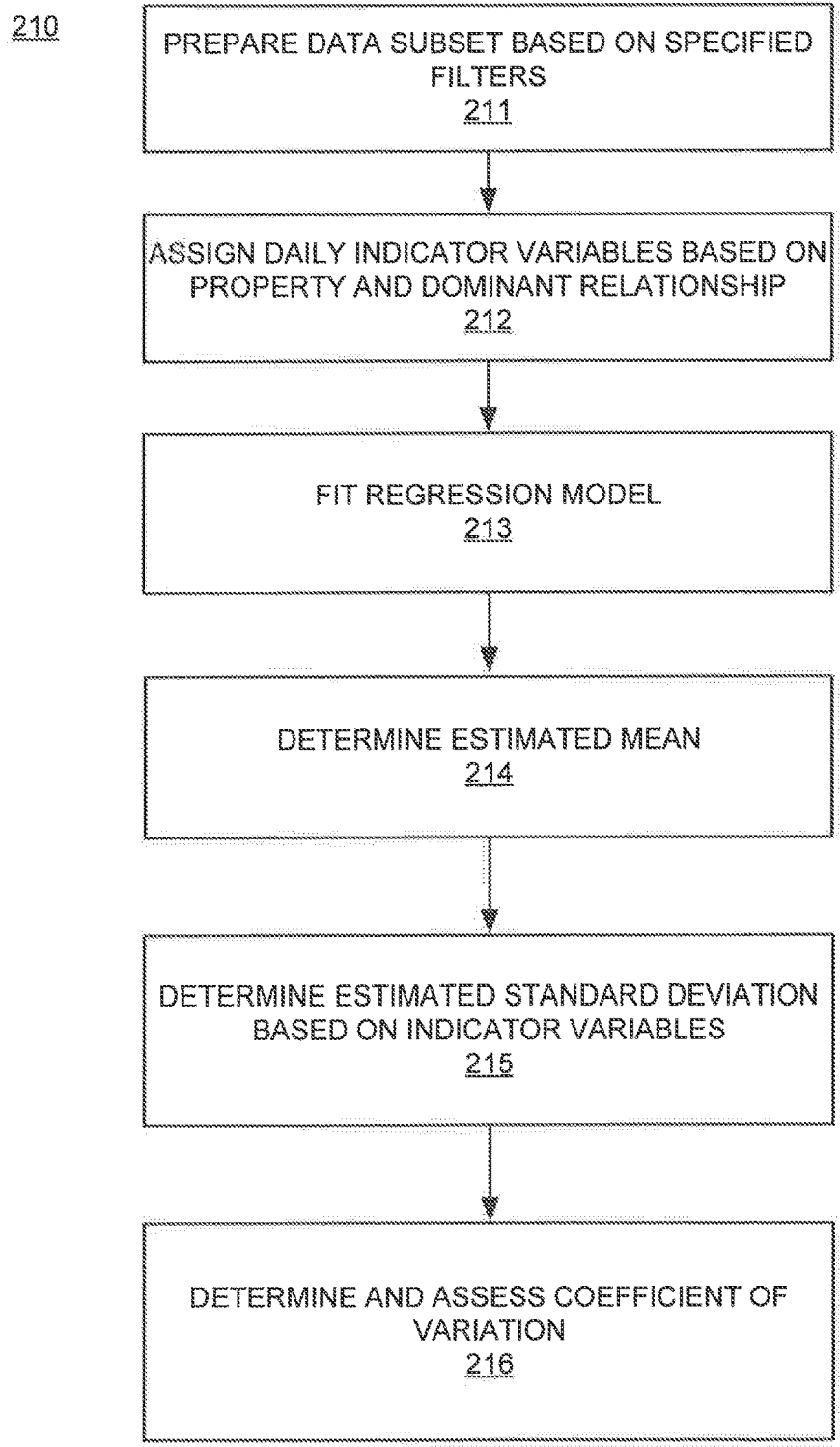
FIG. 2D illustrates a portion of an exemplary method for crew planning, in accordance with various embodiments.
Figure 2E:
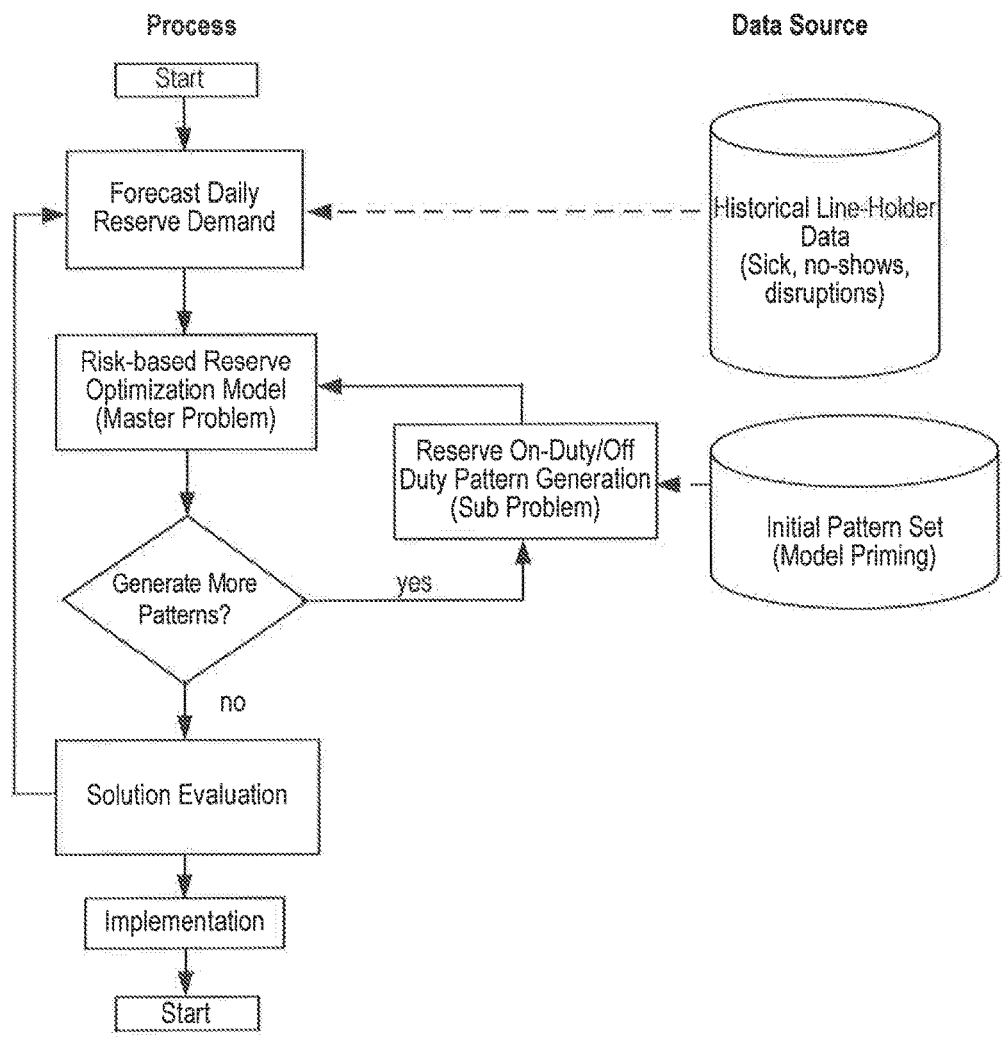
FIG. 2E illustrates an exemplary method for crew planning, in accordance with various embodiments.

With reference now to FIGS. 1 through 2E, in various embodiments crew planning system 115 and/or method 200 utilizes an optimization model for reserve crew planning which incorporates daily acceptable probabilistic risk levels. In an embodiment, reserve forecasting module 145 incorporates a distribution of forecasted daily open-time, for example due to unplanned sick, no-shows, and disrupted operations. Consequently, reserve forecasting module 145 allows users (for example, crew planners) to set minimum levels of daily risk, such as risk of a flight cancellation arising from insufficient reserve crew levels. By varying the minimum level of risk on a daily basis across the crew month, improved reserve demand forecasts may be obtained, and improved reserve demand staffing levels may be selected.

Typically, in the airline industry, unlike regular bidlines for line-holders, reserve crew work schedules do not consist of strings of pairings. Rather, reserve crew work schedules represent consecutive duty days where the crew member, for example a pilot or flight attendant, may be required to fly. In addition, a reserve work schedule includes off-duty periods that represent times where the crew member will not fly. The collection of these intermixed on-duty and off-duty sequences are often referred to as "reserve patterns". The 0/1 pattern below represents a typical reserve pattern for a 30-day crew month.

$$\text{Time(i.e., day)} t = \begin{matrix} 1 & 2 & 3 & 4 & & & & & & & & & & & & & & & & & & & & & & & & \ldots & & & & & & & & & & & & & & & & & & 30 \\ 1 & 1 & 1 & 1 & 0 & 0 & 1 & 1 & 1 & 1 & 0 & 0 & 0 & 0 & 1 & 1 & 1 & 1 & 1 & 0 & 0 & 0 & 1 & 1 & 1 & 1 & 0 & 0 & 0 & 0 \end{matrix}$$

where a 1 represents an on-duty day and a 0 represents an off-duty day of the crew month. In reserve forecasting module 145, a decision variable of a high-level problem reflects the decision to include (or not include) a potential contractually feasible reserve crew schedule, such as the one illustrated above, in a potential crew staffing solution. Stated another way, in reserve forecasting module 145 this binary decision variable may be defined mathematically as:

$$x_j = \begin{cases} 1 & \text{if pattern } j \text{ is included in the solution} \\ 0 & \text{otherwise} \end{cases} \quad \text{(Equation 1)}$$

$$\forall j \in P$$

In an embodiment, reserve forecasting module 145 is configured to determine a minimum number of reserves needed to cover the expected reserve demand throughout the crew month, at a minimal acceptable risk set by a user. Stated differently, reserve forecasting module 145 may be configured to provide an answer to the question, "For each day, how many reserve crew are needed in order to provide a desired level of certainty that reserve crew demand will not exceed reserve crew supply?"

In an embodiment, in reserve forecasting module 145, a minimum number of reserve crew needed to cover the expected demand may be represented mathematically as:

(Equation 2)

$$\min \text{Cost} = \sum_{j \in P} x_j \quad (2)$$

where $x_j$ represents the binary decision variable to include the reserve pattern j in the solution. P represents the set of all reserve patterns under consideration. Modifying Equation (2) to reflect the financial cost of the patterns selected to cover the expected demand yields:

(Equation 2a)

$$\min \text{Cost} = \sum_{j \in P} C_j x_j \quad (2a)$$

where $C_j$ represents the financial cost of each reserve pattern j. In various embodiments, reserve forecasting module 145 incorporates other objective functions, and/or capabilities, for example approaches for maximizing utilization of reserve crews needed to cover the expected open time in a schedule. It will be appreciated that such capabilities may utilize and/or incorporate additional constraints, input data, and/or the like.

In an embodiment, a primary constraint utilized by reserve forecasting module 145 insures that the number of crew reserves allocated on any day t within the crew month meets or exceeds the number needed with a probability of $\alpha_t$. In reserve forecasting module 145, this constraint may be of the initial mathematical form:

$$P(\Sigma_{j \in P} A_{jt} x_j \geq d_t) \geq \alpha_t \forall t \in T \quad (3)$$

(Equation 3)

where $A_{jt}$ it represents a mapping coefficient configured to relate the reserve pattern to the day of the month t. In one embodiment, $A_{jt}$ equals 1 if the reserve pattern j has an on-duty day on day t; similarly, $A_{jt}$ equals 0 if the reserve pattern j has an off-duty day on day t.

In various exemplary embodiments, reserve forecasting module 145 incorporates probabilistic-based reserve planning model, which may be represented mathematically as:

$$\min \text{Cost} = \sum_{j \in P} x_j \quad (2)$$

Subject to:

$$P\left(\sum_{j \in P} A_{jt} x_j \geq d_t\right) \geq \alpha_t \quad (3)$$

$$\forall t \in T$$

and $$x_j = \begin{cases} 1 & \text{if pattern } j \text{ is included in the solution} \\ 0 & \text{otherwise} \end{cases} \quad (1)$$

$$\forall j \in P$$

In various exemplary embodiments, in reserve forecasting module 145, Equation 3 represents a chance constraint where the physical constraint of allocating enough reserves to meet or exceed the forecasted expected reserve demand, $d_t$ is represented as a probability statement with distribution $f(d_t)$. $\alpha_t$ represents the minimum probability that the number of allocated reserve patterns on day t will exceed the forecasted reserve demand. Stated another way, $\alpha_t$ may be considered to represent the "reliability" of a particular reserve crew allocation. $\alpha_t$ may have a value between 0 (i.e., virtually no reliability) and 1 (i.e., essentially perfect reliability).

By utilizing probabilistic techniques as disclosed herein, reserve forecasting module 145 is configured to evaluate and/or modify the level of risk associated with a particular reserve staffing approach. Additionally, reserve forecasting module 145 may be configured to receive a desired value of $\alpha_t$ as an input, and generate a proposed reserve staffing approach that meets or exceeds the desired $\alpha_t$ value while simultaneously reducing and/or minimizing associated expenses, in other words, $\alpha_t$ may be modeled as a variable within reserve forecasting module 145.

By way of comparison, prior crew planning and/or reserve crew planning approaches do not incorporate probabilistic reliability approaches. As a result, these prior approaches tend to either under-estimate or over-estimate the number of reserves needed, at least in part because they fail to incorporate the variation of the expected reserve demand into their reserve planning process.

For example, past experience may indicate that an airline needs an average of 50 reserve pilots to service flights on a particular day, such as on the July 4$^{th}$ holiday. However, past experience also indicates that the expected reserve demand associated with that day has a large variance. It will be appreciated that a different level of reserve staffing will be needed for a particular day when the standard deviation is larger (for example, +/−20 reserves) as compared to when the standard deviation is smaller (for example, +/−5 reserves). When the variance is small, providing reserve staffing approximately equal to an expected reserve demand may work well. However, as the variance of the expected reserve demand increases, the likelihood of not covering the schedule also increases, leaving the carrier at risk of having a crew shortage that results in costly cancellations. In accordance with principles of the present disclosure, in various embodiments crew planning system 115 is configured to account for such risks, allowing a crew planner to control risk exposure, for example by varying the acceptable risks on a daily basis across the crew month.

With momentary reference to FIGS. 2A and 2B, in various embodiments reserve forecasting module 145 is configured to evaluate and/or model reserve demand 271. Prior approaches often allocated reserves based upon peak day demand (illustrated as dashed line 275 in FIG. 2A); in contrast, in accordance with principles of the present disclosure, reserve forecasting module 145 is configured to consider the probabilistic components of reserve demand 271. Stated another way, reserve demand 271 may be considered to be a set of daily reserve demands, with reserve demand for each day 272 having a corresponding probability distribution 273. The probability distribution associated with reserve demand for a particular day 272 (for example, probability distribution 273A) may vary from the probability distribution associated with a different day 272 (for example, probability distribution 273B or 273C).

Continuing to reference FIGS. 1 through 2E, in various embodiments reserve forecasting module 145 may be configured to model the risk of not covering the expected reserve demand. In an embodiment, reserve forecasting module 145 may model and/or determine the risk using the complement of Equation 3, which may be expressed as:

(Equation 3a)

$$P\left(\sum_{j \in P} A_{jt} x_j \leq d_t\right) \leq 1 - \alpha_t \quad (3a)$$

$$\forall t \in T$$

where $1-\alpha_t$ represents the risk of not having enough reserves to cover a particular schedule on day t, in Equations 3 and 3a, the reserve demand, $d_t$, represents a random variable.

It will be appreciated by those skilled in the art that the constraints represented by Equation 3 and Equation 3a may be problematic for integer programming techniques. Both of these constraints represent nonlinear functions. In accordance with various exemplary embodiments, in reserve forecasting module 145 these constraints may be modeled via approaches other than integer programming. Reserve forecasting module 145 may be configured to consider $d_t$, a random variable with a mean ($\mu_{d_t}$), variance ($\sigma_{d_t}$), and a known distribution distribution $f(d_t)$; in this instance reserve forecasting module 145 may consider Equation 3a to represent the cumulative distribution function, F(·), of the expected daily reserve demand. Accordingly, in reserve forecasting module 145, this constraint may be modeled and/or expressed in terms of a cumulative distribution function (CDF) as follows:

(Equation 4)

$$F\left(\sum_{j \in P} A_{jt} x_j\right) \geq 1 - \alpha_t \quad (4)$$

$$\forall t \in T$$

In reserve forecasting module 145, inverting the cumulative distribution function yields the following deterministic equivalent constraint:

(Equation 5)

$$\sum_{j \in P} A_{jt} x_j \geq F^{-1}(1 - \alpha_t) \quad (5)$$

$$\forall t \in T$$

In various embodiments, in reserve forecasting module 145 the result $F^{-1}(1-\alpha_t)$ can be evaluated for a given level of acceptable risk, $(1-\alpha_t)$, in order to obtain a lower bound on the number of reserves needed to cover the schedule on day t. Stated another way, reserve forecasting module 145 may be utilized to determine the likelihood of a particular number of reserves being sufficient to cover reserve demand for that day.

This lower bound may be utilized as an input to an optimization model, which may be internal to reserve forecasting module 145, or which may be external to reserve forecasting module 145 (for example, as part of external systems and databases 160).

It will be appreciated that, in reserve forecasting module 145, a practical extension to evaluating the probabilistic term a priori allows an acceptable level of risk to be evaluated as part of an optimization solution. In reserve forecasting module 145, because the deterministic equivalent constraint is derived from the cumulative distribution function, it can be shown to represent a concave function for $\alpha_t$ greater than 0.5. Accordingly, reserve forecasting module 145 may generally be utilized to obtain and/or consider solutions that have a reliability of at least 50% on any day of the crew month. Stated differently, solutions having a reliability of less than 50% would promote scenarios that promote crew shortfalls, and such solutions may desirably be disregarded.

With reference now to FIGS. 3A and 3B, in various exemplary embodiments crew planning system 115 models expected reserve demand, for example by utilizing a probability distribution model. By using a probability distribution rather than simple average demand, crew planning system 115 explicitly incorporates the stochastic effect of reserve demand variability. FIG. 3A illustrates an exemplary probability distribution of reserve demand resulting from operation of crew planning system 115. FIG. 3B illustrates an exemplary cumulative distribution function usable in crew planning system 115 to evaluate risk as a constraint. It will be appreciated that using a cumulative distribution function allows crew planning system 115 to include risk levels as part of an overall optimization solution, rather than simply utilizing risk as an input provided by a user 105 (for example, a crew planner).

In various exemplary embodiments, reserve forecasting module 145 may be utilized to maximize the reliability (or minimize the risk) associated with a reserve planning solution. Because the deterministic constraint remains nonlinear, it can be modeled using a suitable mathematical approach, such as piecewise linear approximation or a decomposition technique such as Benders Decomposition. In one embodiment, reserve forecasting module 145 is configured to consider the basic probabilistic-based reserve model formulation as:

$$\min \text{Cost} = \sum_{j \in P} C_j x_j + \sum_{t \in T} C'_t (1 - \alpha_t) \quad \text{(Equation 2b)}$$

where $C_j$ represents the financial cost of selecting reserve pattern j as part of a selected solution.

(Equation 5A)

Subject to: (5a)

$$\sum_{j \in P} A_{jt} x_j - F^{-1}(1 - \alpha_t) \geq 0$$

$\forall\, t \in T$ (Equation 6)

$$\alpha_t \geq \alpha_{min} \quad (6)$$

$\forall\, t \in T$ and (Equation 1) (1)

$$x_j = \begin{cases} 1 & \text{if pattern } j \text{ is included in the solution} \\ 0 & \text{otherwise} \end{cases}$$

$\forall\, j \in P$

In this embodiment, in reserve forecasting module 145 Equation 2b represents a modification of Equation 2 to incorporate a cost, $C'_t$, of not having enough reserve crews to cover the schedule when line holders cannot meet their obligated bidlines. In various embodiments, a suitable method may be applied for estimating or calibrating a value for the cost parameter $C'_t$. One exemplary method utilizes an ad-hoc heuristic to estimate a general penalty value for $C'_t$; such an approach uses the same unit penalty for all incremental values of risk $(1-\alpha_t)$. This exemplary method has the advantage of simplicity, but it represents a blunt approach which may underestimate or overestimate the true impact of a change in the risk compared to the cost of an added reserve crew to cover the schedule.

Another exemplary method utilizes a financial estimate of the true cost of cancelling a flight on day t (or the cost of canceling one or more flights on day t). This exemplary method is more complicated, and provides an estimate of the realistic cost of the cancellation and its impact on the flight schedule for the remainder of the day. It will be appreciated that a financial estimate method may vary significantly from carrier to carrier; however, a financial estimate method assigns a cost of cancelling a flight to provide an incentive to reserve forecasting module 145 to avoid cancellations. Moreover, a financial estimate method may utilize extended cost estimates to reflect nonlinear aspects of cancellation costs (for example, allowing the unit costs to increase) as the risk on any given day in the planning horizon increases. In this manner, reserve forecasting module 145 may account for the increase in cost due to the possibility that as the risk increases, the number of likely cancellations will also increase.

In various exemplary embodiments, in reserve forecasting module 145, Equation 5a may be utilized as an alternative form of Equation 5, where $F^{-1}(1-\alpha_t)$ represents a nonlinear variable, rather than a constant modeled using piecewise linearization or Benders Decomposition. Additionally, in reserve forecasting module 145 Equation 6 may be used to represent a common lower bound for the reliability or likelihood of covering the schedule on day t. The common lower bound may be selected as suitable, for example by a crew planner.

In accordance with principles of the present disclosure, output of reserve forecasting module 145 (for example, solutions for the models described by Equations 1-3 or Equations 1, 2b, 5a and 6) enables crew planning groups to determine reserve staffing needs. Using reserve forecasting module 145, crew planners obtain access to information that more accurately represents reality, at least in part by incorporating the probabilistic nature of line-holder disruptions, sick calls, and no shows that define reserve demand on a daily basis. In addition, reserve forecasting module 145 allows crew planners or other decision makers to evaluate the tradeoffs that exist between reserve crews levels and the likelihood of flight cancellations due to crew shortfalls.

Figure 2F:
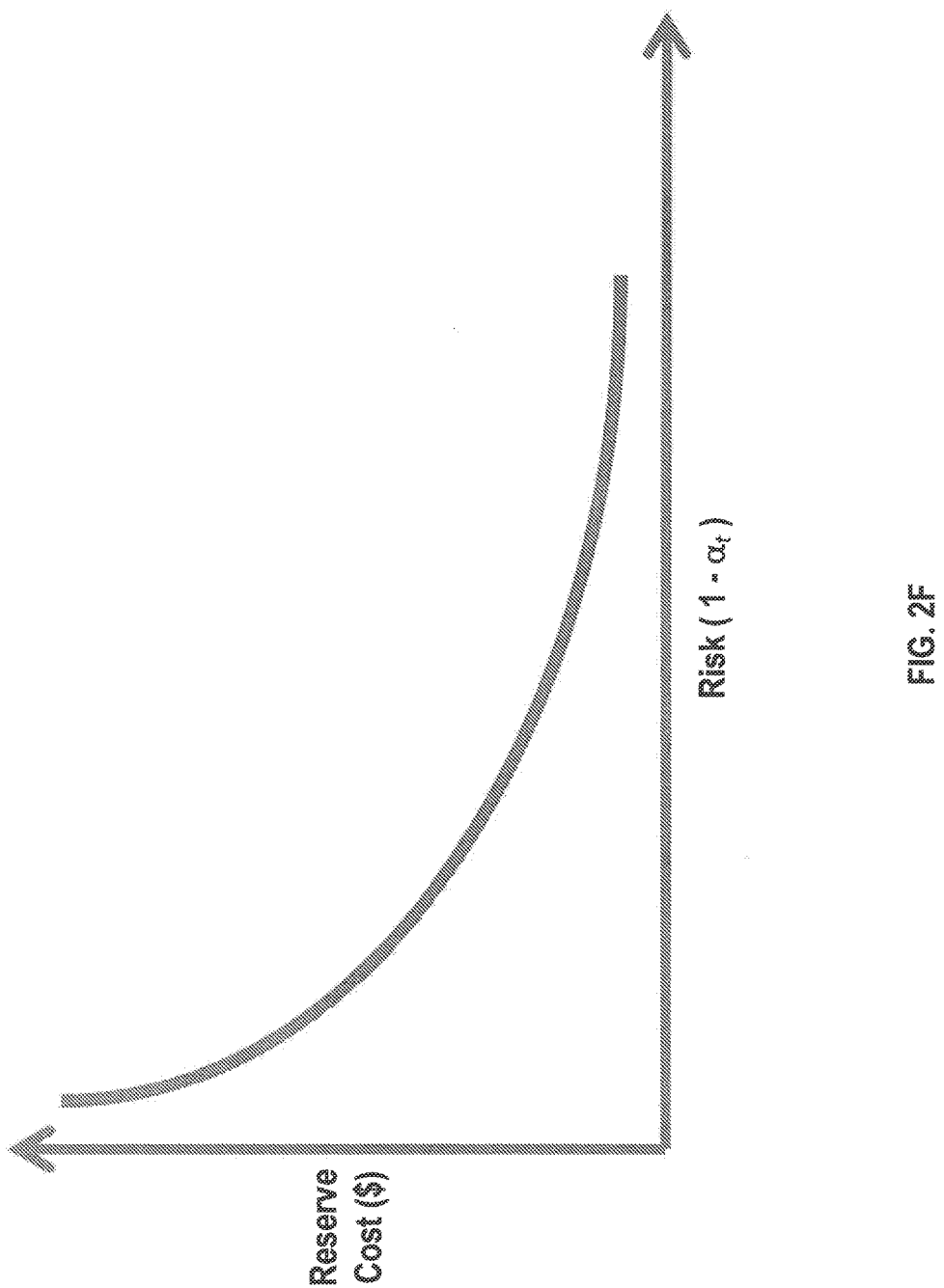
FIG. 2F illustrates an exemplary cost/risk trade-off relationship in accordance with various embodiments.

For example, via use of reserve forecasting module 145, crew planning analysts can evaluate the trade-off between reserve crew and the likelihood of cancelling flights by stipulating a minimum acceptable risk $(1-\alpha_t)$ as an input to an optimization model. Solving the optimization model for many values of the minimum acceptable risk yields a trade-off between the risk of cancellation and the total cost associated with covering the schedule with reserve crew. In accordance with principles of the present disclosure, FIG. 2F provides an illustration of the trade-off or non-inferior set of solutions produced using this approach. Moreover, any suitable method for evaluating the multi-objective trade-offs can also be used to produce this relationship. In sum, via use of reserve forecasting module 145, more efficient reserve plans and schedules may be obtained. The overall number of reserves needed may be reduced by better matching reserve allocations to forecasted demand.

With continued reference to FIGS. 1 through 2F, in various embodiments crew planning system 115 is configured to provide accurate reserve demand forecasting. It will be appreciated that, absent reasonable forecasts of the reserve mean, standard deviation (function of variance) and a form of the distribution, exemplary optimization models may struggle to accurately allocate reserves and/or control the risk of not covering the schedule. Accordingly, crew planning system 115 may be configured to implement a customized forecasting module, for example reserve forecasting module 145, in order to calibrate and forecast reserve demand based on historical data, while accounting for variability arising from seasonal factors, special events, and/or the like.

In an embodiment, reserve forecasting module 145 utilizes regression to forecast the likely open duty periods (ODP) level for each day in the forecasting horizon based on historical operational data for ODP levels. The forecasting horizon may be any suitable time period, for example one week, four weeks, one month, two months, and/or the like. Reserve forecasting module 145 is configured to consider a daily historical profile of block hours and ODP. Reserve forecasting module 145 is also configured to consider that the historical daily profile resembles the future planning horizon on average. A planning horizon is typically defined as a 30 or 31 day planning period.

Reserve forecasting module 145 uses regression to create forecast output. In an embodiment, forecast output comprises the mean and standard deviation of ODP. In reserve forecasting module 145, in one regression model, a linear function of ODP is fitted using seven (7) structural variables. The structural variables include block hours as a continuous variable, and six time-based indicator variables that account for impacts such as seasonality, and weekend or weekday events. The indicator variables have values of either 0 (when the conditions are not fulfilled) or 1 (when the conditions are fulfilled). In one embodiment, in reserve forecasting module 145 an indicator variable is included in the regression formulation if the data meets the seasonality condition. Otherwise, the indicator variable will equal 0 and not be included in the regression model.

In various embodiments, reserve forecasting module 145 utilizes the following indicator variables:
Peak days—defined as days historically having excessive demand (for example, the week of Thanksgiving, the week of Christmas and New Year, etc.).
Transition day—defined as the first four days of the planning period.
Weekend—defined as Saturday and Sunday.
Shoulder weekday—defined as Tuesday and Wednesday.
Summer months—defined as May, June, and July.
Shoulder-Fall months—defined as August and September.

It will be appreciated that fewer variables and/or additional variables may be utilized in reserve forecasting module 145. In reserve forecasting module 145, the indicator variables may be configured with a dominant relationship or hierarchy within the regression process. In one embodiment, peak days are dominant over other indicator variables. If a day is designated as peak day, it does not belong to any of the weekend, shoulder, summer and shoulder-fall seasons. In this embodiment, a transition day is only dominant over weekend and weekday; in other words, if a day is designated as a transition day, it is not considered as a weekday or weekend. Reserve forecasting module 145 may be configured with different transition days for different seasons.

Reserve forecasting module 145 may be configured to restrict historical data, for example based on a boundary filter. In this manner, reserve forecasting module 145 can account for and/or appropriately consider circumstances when the nature of the historical data has changed, for example when equipment historical nature or mission has changed substantially during the period covered by the historical data. For example, reserve forecasting module 145 may be configured to exclude at least a portion of historical data associated with a plane that flew for 14000 annual block hours on average 3 years ago, but is currently running only 10000 annual block hours, for example due to anticipated retirement of the plane.

With reference specifically to FIG. 2C, in an embodiment a method 200 for reserve planning comprises forecasting a reserve demand including a mean and standard deviation (step 210), optimizing a risk-based solution to meet the reserve demand (step 220), and evaluating the solution (step 230). Feedback regarding the efficacy of the selected solution may be utilized as an input to refine future demand forecasts (step 240).

With additional reference to FIG. 2D, in one embodiment, in method step 210 of method 200, reserve forecasting module 145 prepares a subset of historical ODP and block time data based on specified filters (for example, selecting a time period of May 2009 through January 2011) (step 211). Reserve forecasting module 145 assigns indicator variables for each day, based at least in part on its property and dominant relationship (step 212). Reserve forecasting module 145 fits a linear regression model of ODP as a function of block hour and the specified indicator variables (step 213). Regression results include the coefficients for the block hour and each indicator variable as well as the intercept. Using the calibrated coefficients, reserve forecasting module 145 utilizes the regression equation to estimate the mean forecast of the open duty periods (ODP) (step 214).

In various embodiments, reserve forecasting module 145 determines a standard deviation based at least in part on a dominant relationship of the indicator variables (step 215). Reserve forecasting module 145 calculates standard deviations based on ODP historical data within the same range as previously used for the regression. Reserve forecasting module 145 may be configured to utilize the following list of groups when determining standard deviations:
Peak days (designated by peak-day=1), considered as 20% of the historic average of peak days.
Weekday—base month (weekend=0, shoulder=0, summer=0, shoulder-fall=0).
Weekend—base month (weekend=1, shoulder=0, summer=0, shoulder-fall=0).
Shoulder weekday—base month (weekend=1, shoulder=0, summer=0, shoulder-fall=0).
Transition—base month (transition=1, summer=0, shoulder-fall=0).
Weekday—summer month (weekend=0, shoulder=0, summer=1, shoulder-fall=0).
Weekend—summer month (weekend=1, shoulder=0, summer=1, shoulder-fall=0).
Shoulder weekday—summer month (weekend=1, shoulder=0, summer=1, shoulder-fall=0).
Transition—summer month (transition=1, summer=1, shoulder-fall=0).
Weekday—shoulder-fall month (weekend=0, shoulder=0, summer=0, shoulder fall=1).
Weekend—shoulder-fall month (weekend=1, shoulder=0, summer=0, shoulder fall=1).

Shoulder weekday—shoulder-fall month (weekend=1, shoulder=0, summer=0, shoulder fall=1).

Transition—shoulder fall month (transition=1, summer=0, shoulder fall=1).

In reserve forecasting module 145, the base month includes the peak-season and other months not designated as summer/shoulder-fall. A peak day has an indicator on peak-day and peak-season. Standard deviation is calculated as the square root of (Sum of square (x−mean x)/n−1).

In various embodiments, reserve forecasting module 145 is configured to detect and/or account for outliers in the historical data. In one embodiment, in reserve forecasting module 145, an observation is defined as an outlier if it skews the average calculation by more than a selected percentage, for example 2%, 3%, 4%, 5%, and/or 10%. Reserve forecasting module 145 utilizes an iterative scheme to remove outlier observations.

The foregoing standard deviation calculations are utilized in certain embodiments of reserve forecasting module 145 due to the nature of regression model, to separate the data and forecasts based on the lift-effect from the various indicator variables. In other exemplary embodiments, reserve forecasting module 145 utilizes a modified calculation of standard deviation configured to account for the presence of additional continuous variables. Regardless of the standard deviation calculation approach employed in reserve forecasting module 145, reserve forecasting module 145 may be configured to validate the standard deviation calculations by comparing them with the calculated mean to obtain a coefficient of variation (CV) (step 216). A CV greater than a target value (for example, 0.4, 0.6, and/or the like) for a large number of observations (for example, more than 30 observations) may result in a notification displayed for a user 105 (for example, an indication that the data set has a high variance that may result in increases in risk). It will be appreciated that, responsive to such notification, a crew planner may recognize that a reserve staffing level may need to be modified; moreover, a crew planner may recognize that the increased variance in the historical data is due to a special event that may not occur in the future and adjust the allowable risk for those days in the month accordingly.

In various embodiments, reserve forecasting module 145 is configured to utilize certain assumptions when determining the mean and variance of the ODP forecast, the corresponding impact on optimization module 147, and ultimately, the calculated final number of reserves needed to cover a particular schedule at a desired level of risk. In one embodiment, reserve forecasting module 145 utilizes the following assumptions:

The forecast is assumed to represent the mean value of the ODP and an outcome of the regression process.

The standard deviation represents the variability of the data around the mean forecast and is based on historical data.

The standard deviation is calculated using the process described herein. In some embodiments, the standard deviation is based on a preset coefficient of variation; in other embodiments, the standard deviation is based on historical data minus outliers.

Outlier detection is based on data sets greater than a selected number of observations (for example, 4, observations, 5 observations, or 6 observations; in general any selected number of observations that is acceptable to a user 105), and observations that influence the mean by more than a selected percentage (for example, 2%, 3%, 4%, 5%, 10%, and/or the like; in general, any selected percentage desired by a user 105) may be discarded.

The distribution of the forecast is assumed to be normal.

The regression model and standard deviation assume sufficient historical data exists to accurately calibrate the model.

Any day within the forecast horizon and historical data must comply with one of the 12 group combinations used to estimate the standard deviation.

It will be appreciated that, in various exemplary embodiments, in certain instances a user 105 may "prime" crew planning system 115 with generic seasonal levels derived from a similar fleet type in which data does exist (in lieu of actual historical data, for example when assessing a new fleet type, a new set of crew, and/or the like).

Returning again to FIG. 1, in various embodiments crew planning system 115 utilizes optimization module 147 to solve a risk-based optimization model, using the forecasted demand and variance output by reserve forecasting module 145. Optimization module 147 uses a sub-problem to generate potential feasible on-duty/off-duty patterns used to determine the number of reserve crew needed to meet the expected reserve demand. Optimization module 147 generates reserve bid-lines, for example based on contractual rules governing reserve bid-line construction.

In accordance with principles of the present disclosure, in one embodiment optimization module 147 utilizes two integrated models to determine the optimal number of reserve crews needed to cover the ODP levels. The first model generates the possible bid-lines that can be used to cover the ODP on a schedule. Optimization module 147 uses a suitable algorithm (for example, an algorithm similar to one used to generate crew pairings for line holder optimization) to generate a pool of potential reserve patterns from which a risk-based solution may be selected (i.e., a number of reserves needed to cover the schedule for a particular day). As used herein, in optimization module 147 the process of generating pairings or potential reserve patterns may be referred to as the "sub-problem". Optimization module 147 selects the bid-lines needed to cover the ODPs, such that the number of reserves needed is minimized while meeting the risk limits specified by a user 105, for example a crew planner. In optimization module 147, the risk-based reserve optimization model is configured to solve what is often referred to as the "master" problem.

Optimization module 147 is configured to generate reserve patterns. The bid-line generator determines the possible bid-lines that can be used to cover ODPs, for example based at least in part on contractual crew rules, federal regulations, and/or the like. To be considered as potentially suitable, the lines generated by the sub-problem should to be feasible and reasonably efficient lines.

In various embodiments, optimization module 147 is configured to incorporate and/or utilize the following contractual rules:

Reserve staff can work for at most 18 working days within a planning period;

Reserve staff must have at least 4 consecutive days-off (INF) days;

Reserve staff must have at least 2 consecutive days-off when not working; and

Reserve staff can at most be assigned to 6 consecutive working days.

It will be appreciated that, depending on regulatory requirements, contractual obligations, and/or the like, additional, fewer, and/or differing contractual rules may be applicable and thus considered by optimization module 147; the foregoing are presented by way of illustration and not of limitation.

In various embodiments, optimization module 147 is configured to implement a minimum working day rule. For example, a minimum working day rule may specify a minimum number of workdays within the reserve pattern or assigned line. The minimum working day rule may be based at least in part on equipment (for example, Airbus 320 vs. Boeing 737), position (Captain vs. First Officer), and/or the like.

In various embodiments, crew planning system 115 utilizes reserve forecasting module 145 and optimization module 147 to formulate and determine the number of reserve crews needed to cover the schedule at a particular level of risk. Additionally, crew planning system 115 may be configured to implement and/or facilitate a feedback loop. In this manner, crew planning system 115 allows a user 105, for example a crew planner, to refine risk levels and adjust a solution as desired, for example in order to better match transitions between boarding months, special events, holidays, and so forth.

Via use of crew planning system 115, modification of risk levels for a particular day in a forecast period (for example, accepting a higher level of risk for that day) may be utilized to modify risk levels for a different day in a forecast period (for example, creating a lower level of risk for that day), all without incurring additional reserve expenses (i.e., with a fixed number of reserve resources). For example, for a certain high-traffic date, a high level of certainty (i.e., very low risk) regarding reserve staffing levels may be desired. Via use of crew planning system 115, a user 105, such as a crew planner, may increase risk levels associated with other dates in the forecast period, resulting in a lowering of reserve staff allocated to those lower-priority days. Consequently, based on contractual obligations, regulatory requirements, and so forth, additional reserve staff may now be available for the high-traffic date. Thus, additional reserve staff may be allocated to the high-traffic date in order to decrease the risk level associated with that date.

Crew planning system 115 enables improved risk allocation decisions and implementation. Viewed from a baseline cost and risk perspective, crew planning system 115 allows modified and/or reduced risk levels compared to the baseline to be obtained for the baseline cost; conversely, crew planning system 115 also allows baseline risk levels to be obtained at a below-baseline cost.

In crew planning system 115, variables and parameters, such as acceptable risk for a particular day, may be revised, adjusted, and/or modified, for example on a daily basis. Crew planning system 115 can thus quickly respond to external factors influencing reserve demand (for example, widespread illness, civil unrest, labor disruptions, weather, equipment failures, and the like) in order to (I) reduce and/or minimize the chances for flight cancellations arising from insufficient reserve staffing levels, and/or (ii) reduce expenses associated with overstaffing of reserve demand.

It will be appreciated that as an organization's tolerance for risk decreases, the value of principles of the present disclosure (for example, use of crew planning system 115) to that organization increases.

Figure 4:
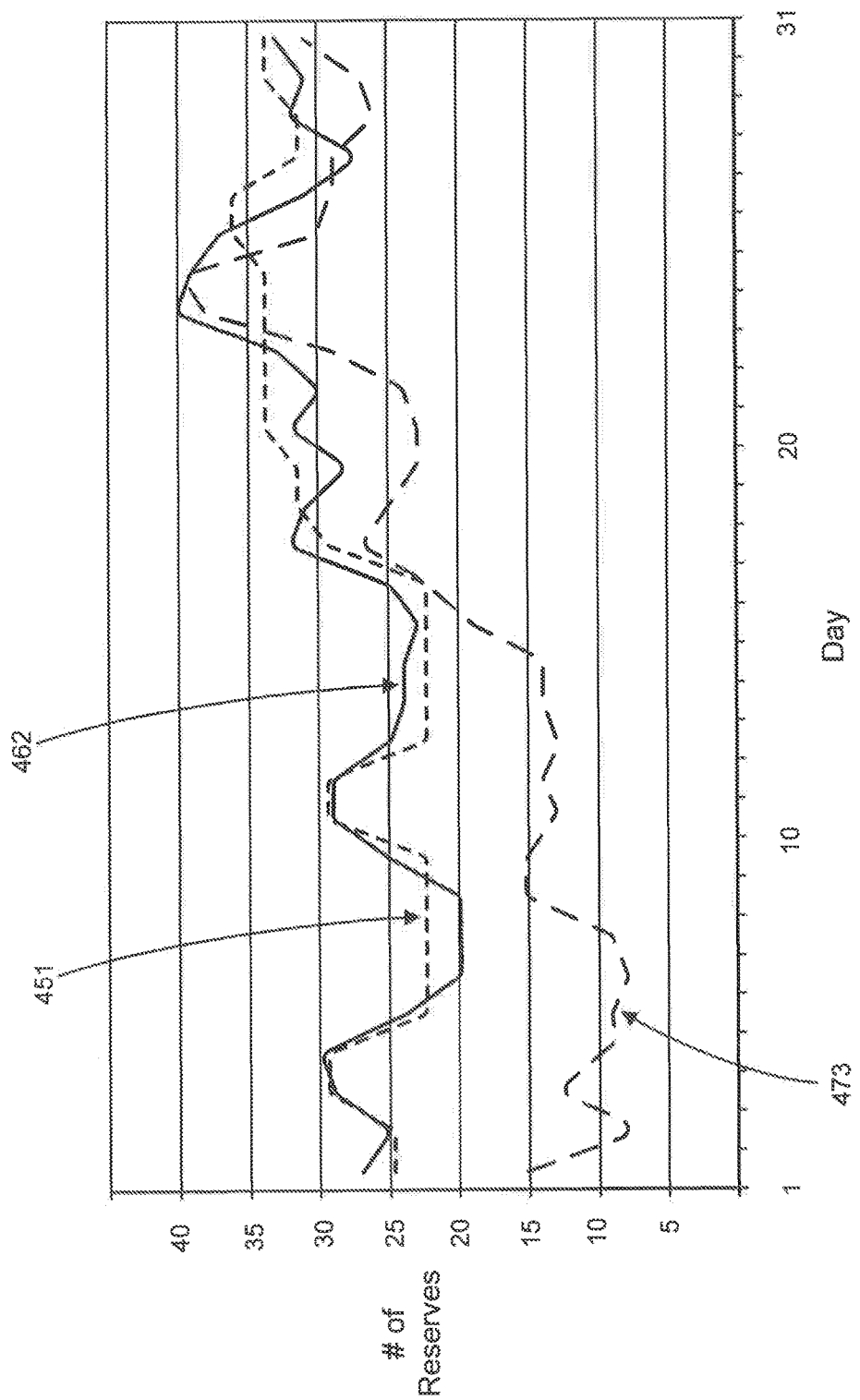
FIG. 4 illustrates results of an exemplary crew planning system, in accordance with various embodiments.

With reference now to FIG. 4, exemplary results of operation of an embodiment of crew planning system 115 are illustrated. In FIG. 4, results of operation of an embodiment of crew planning system 115 are presented for an exemplary December month of flight schedule data for a group of pilots for example, AirBus captains) based out of a particular city (for example, Philadelphia). In the exemplary embodiment illustrated in FIG. 4, a global allowable risk of 10% for each day was utilized.

In FIG. 4, a traditional reserve forecasting approach utilizing peak demand generated the proposed reserve demand staffing level 451. In contrast, crew planning system 115 generated the proposed reserve demand staffing level 462. In addition, historical data for the exemplary December month is plotted in FIG. 4 as actual reserve demand 473. FIG. 4 illustrates how crew planning system 115 does a better job at allocating reserves as compared to prior approaches, particularly with respect to the peak reserve demand levels seen from approximately December 20 onwards.

Via use of crew planning system 115, opportunities to reduce the total number of reserves needed to cover a schedule may be identified. Table 1 illustrates potential reserve staffing savings arising from use of crew planning system 115, assuming only a minimum savings for each month of the year. It will be appreciated that in Tables 1 and 2, an example industry standard wage plus fringe for pilots and flight attendants is utilized; actual values may vary significantly based on the carrier, collective bargaining agreements, and so forth.

TABLE 1

| Category and Equipment | Reduction in Reserves (Minimum) | Annual Unit Cost ($) | Total Savings ($) |
|---|---|---|---|
| Pilots | | | |
| E9 | 0 | $119,153 | $ 0 |
| AB | 0 | $119,153 | $ 0 |
| 7I | 6 | $119,153 | $ 714,918 |
| 33 | 0 | $119,153 | $ 0 |
| 30 | 0 | $119,153 | $ 0 |
| Pilot Savings | 6 | | $ 714,918 |
| First Officers | | | |
| E9 | 0 | $119,153 | $ 0 |
| AB | 16 | $119,153 | $1,906,448 |
| 7I | 17 | $119,153 | $2,025,601 |
| 33 | 0 | $119,153 | $ 0 |
| 30 | 0 | $119,153 | $ 0 |
| F.O. Savings | 33 | | $3,932,049 |
| Flight Attendants | | | |
| Mix | 64 | $ 37,452 | $2,399,488 |
| Total Savings | | | $7,046,455 |

In Table 2, potential annual savings associated with use of crew planning system 115 are illustrated, assuming average reserve reductions throughout the year.

TABLE 2

| Category and Equipment | Reduction in Reserves (Average) | Annual Unit Cost ($) | Total Savings ($) |
|---|---|---|---|
| Pilots | | | |
| E9 | 1 | $119,153 | $ 119,153 |
| AB | 7 | $119,153 | $ 834,071 |
| 7I | 10 | $119,153 | $1,191,530 |
| 33 | 7 | $119,153 | $ 834,071 |
| 30 | 16 | $119,153 | $1,906,448 |
| Pilot Savings | 41 | | $4,885,273 |
| First Officers | | | |
| E9 | 3 | $119,153 | $ 357,459 |
| AB | 35 | $119,153 | $4,170,355 |
| 7I | 28 | $119,153 | $3,336,284 |

TABLE 2-continued

| Category and Equipment | Reduction in Reserves (Average) | Annual Unit Cost ($) | Total Savings ($) |
|---|---|---|---|
| 33 | 20 | $119,153 | $ 1,191,530 |
| 30 | 5 | $119,153 | $ 595,765 |
| F.O. Savings Flight Attendants | 81 | | $ 9,651,393 |
| Mix | 113 | $ 37,452 | $ 4,232,076 |
| Total Savings | | | $18,768,742 |

It will be appreciated that in actuality, results associated with utilization of crew planning system 115 are likely to fall somewhere between the values shown in Table 1 and the values shown in Table 2. Moreover, savings associated with use of crew planning system 115 may be variable depending on the level of acceptable risk selected by a user 105, for example a crew planner. For example, if a user 105 utilizes an acceptable risk of 0.001 in crew planning system 115 (i.e., to obtain a solution having a 99.99% probability of covering the reserve demand), the number of required reserves will grow excessively. Accordingly, in practical applications of crew planning system 115, a user 105 may utilize the risk level to "trade-off" risk-exposure during a low demand period with risk exposure during a high demand period.

For example, many airlines see a higher number of sick calls during holiday seasons like Christmas, Thanksgiving, and New Year. In contrast, the number of sick calls is often very low in early December. Thus, in these instances, a user 105 may utilize crew planning system 115 to select a higher level of risk during the early part of December (for example, $1-\alpha_r=0.25$), and a lower level of risk during the holidays (for example, $1-\alpha_r=0.05$). By utilizing crew planning system 115 and selecting risk levels that vary during the month, for example based on previous experience and historical distributions, a user 105 may hedge against crew shortages during high demand periods. Stated another way, in this manner a user 105 may utilize crew planning system 115 to generate and/or select reserve patterns that bias on-duty time to days of the month when expected reserve demand is high (and thus, when reserve crews are difficult to obtain on short notice). Similarly, in this manner a user 105 may utilize crew planning system 115 to generate and/or select reserve patterns that favor off-duty days where reserve demand is low (and thus, when reserve crews are relatively easy to obtain). In sum, crew planning system 115 allows a user 105 to closely tailor reserve schedules to capture high demand periods and better control the risk of having crew shortfalls during critical times of the year.

Principles and features of the present disclosure may suitably be combined with principles of revenue management, for example as disclosed in U.S. patent application Ser. No. 13/348,417 entitled "Overbooking, Forecasting, and Optimization Methods and Systems" filed on Jan. 11, 2012, now U.S. Patent Application Publication 2013-0132128 published on May 23, 2013, which is incorporated herein by reference in its entirety.

Principles of the present disclosure may suitably be combined with principles of forecasting, demand modeling, and/or the like, for example as disclosed in U.S. patent application Ser. No. 13/791,672 entitled "Demand Forecasting Systems and Methods Utilizing Unobscuring and Unconstraining" filed on Mar. 8, 2013, now U.S. Patent Application Publication 2014-0257925 published on Sep. 11, 2014, U.S. patent application Ser. No. 13/791,691 entitled "Demand Forecasting Systems and Methods Utilizing Fare Adjustment" filed on Mar. 8, 2013, now U.S. Patent Application Publication 2014-0257881 published on Sep. 11, 2014, and U.S. patent application Ser. No. 13/791,711 entitled "Demand Forecasting Systems and Methods Utilizing Prime Class Remapping" filed on Mar. 8, 2013, now U.S. Patent Application Publication 2014-0257882 published on Sep. 11, 2014, each of which are incorporated herein by reference in their entirety.

While the present disclosure may be described in terms of an airport, an aircraft, a pilot, and so forth, one skilled in the art can appreciate that similar features and principles may be applied to other transportation systems and vehicles such as, for example, buses, trains, ships, trucks, automobiles and/or the like.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that other interfaces may include mobile devices, kiosks and handheld devices such as mobile phones, smart phones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to utilize such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for probabilistic allocation of reserve staffing for an airline, the method comprising:
    forecasting, by a software crew planning system and utilizing a probabilistic reserve staffing model incorporating variance information associated with historical reserve airline staff demand levels, a daily reserve airline staff demand level for each day in a first time period;
    optimizing, by the software crew planning system, the probabilistic reserve staffing model to generate a reserve airline staffing level for each day in the first time period;
    storing, by the software crew planning system, the reserve airline staffing level in a database;
    tuning, by the software crew planning system, the database to optimize database performance;
    wherein the tuning includes placing frequently used files on separate file systems to reduce in and out bottlenecks;
    designating, by the software crew planning system, the reserve airline staffing level as a key field in a plurality of related data tables to speed searching for data;
    linking, by the software crew planning system, the plurality of related data tables based on a type of reserve airline staffing level in the key fields;
    sorting, by the software crew planning system, the reserve airline staffing level according to a known order to simplify a lookup process;
    obtaining, by the software crew planning system, the reserve airline staffing level from the database;
    implementing, by the software crew planning system, the reserve airline staffing level by staffing an airline flight with a reserve staff member in place of a regularly scheduled airline staff member;
    evaluating, by the software crew planning system, a result of the probabilistic reserve staffing model for each day in the first time period to determine reserve airline staffing results information; and
    modifying, by the software crew planning system and responsive to updated risk information provided by a user, the reserve airline staffing level for a first day in the first time period in order to modify a risk variable associated with the reserve airline staffing level for a second day in the first time period,
    wherein the probabilistic reserve staffing model is formulated as:

$$\min \text{Cost} = \sum_{j \in P} x_j$$

subject to $$P\left(\sum_{j \in P} A_{jt} x_j \geq d_t\right) \geq \alpha_t \ \forall \, t \in T$$

and $$x_j \begin{cases} 1 \text{ if pattern } j \text{ is included in the solution} \\ 0 \text{ otherwise} \end{cases}$$

$$\forall \, j \in P$$

where:
    $\alpha_t$ represents a minimum probability that a selected reserve pattern will exceed the predicted daily reserve airline staff demand level,
    $C_j$ represents a financial cost of selecting reserve pattern j as part of a selected solution,
    $C'_t$ represents a financial cost of having insufficient reserve crews to cover a scheduled set of airline flights in the first time period,
    t represents a day in the first time period,
    $x_j$ represents a binary decision variable to include reserve pattern j as part of a selected solution, and
    $A_{jt}$ represents a mapping coefficient configured to relate a reserve pattern j to the corresponding day t in the first time period.

2. The method of claim 1, further comprising utilizing, by the software crew planning system, the reserve airline staffing results information to forecast a daily reserve airline staff demand level for each day in a second time period.

3. The method of claim 1, wherein the forecasting further comprises:
    accessing, by the software crew planning system, historical reserve airline staff demand information, wherein the historical reserve airline staff demand information is associated with at least one indicator value;
    determining, by the software crew planning system, a regression model for the historical reserve airline staff demand information utilizing the at least one indicator value;
    determining, by the software crew planning system, a mean associated with the historical reserve airline staff demand information; and
    determining, by the software crew planning system, a standard deviation associated with the historical reserve airline staff demand information.

4. The method of claim 1, further comprising:
    reducing, by the software crew planning system, a number of reserve staff based at least in part on the reserve airline staffing level; and
    utilizing the reduced number of reserve staff to service reserve staffing needs for each day in the first time period.

5. The method of claim 1, further comprising varying, by the software crew planning system, a risk variable associated with a first day in the first time period in order to modify a risk variable associated with a second day in the first time period, wherein the risk variable represents the likelihood of the reserve airline staffing level exceeding the reserve airline staff demand on the first day.

6. The method of claim 5, wherein the varying the risk variable associated with the first day comprises increasing the level of acceptable risk associated with the first day.

7. The method of claim 5, wherein the varying the risk variable associated with the first day comprises decreasing the level of acceptable risk associated with the first day.

8. The method of claim 1, wherein the optimizing comprises:
determining, by the software crew planning system, an unsatisfied demand cost associated with the reserve airline staff demand exceeding the reserve airline staffing level on a first day in the first time period;
determining, by the software crew planning system, an excess airline staffing cost associated with the reserve airline staffing level exceeding the reserve airline staff demand on the first day; and
weighting, by the software crew planning system, the unsatisfied demand cost and the excess airline staffing cost to determine whether to modify the reserve airline staffing level on the first day.

9. The method of claim 3, wherein the at least one indicator variable comprises information associated with at least one of a peak day, a transition day, a weekend, a shoulder weekday, a summer month, or a shoulder-fall month.

10. The method of claim 3, wherein the determining a regression model utilizes a plurality of indicator variables, and wherein the plurality of indicator variables are configured with a dominant relationship.

11. The method of claim 10,
wherein the plurality of indicator variables comprise peak day, transition day, weekend,
wherein peak day is dominant over transition day and weekend, and
wherein transition day is dominant over weekend.

12. The method of claim 3,
wherein the reserve staffing level comprises a set of reserve staff members, and
wherein the optimizing, by the software crew planning system, the reserve staffing model to generate the reserve staffing level operates bounded by the following rules:
each reserve staff member can work for at most 18 days in the first time period;
each reserve staff member must have at least 4 consecutive days off in the first time period; and
each reserve staff member can be assigned to at most 6 consecutive working days.

13. The method of claim 3, wherein the optimizing further comprises:
evaluating, by the software crew planning system, a risk of flight cancellation arising from the daily reserve airline staff demand level exceeding a reserve airline staffing level; and
evaluating, by the software crew planning system, a financial impact of a flight cancellation arising from the daily reserve airline staff demand level exceeding a reserve airline staffing level.

14. The method of claim 1, wherein:
the reserve airline staffing level comprises a set of reserve airline staff members,
the first day is a peak day,
the second day is a non-peak day, and
the modifying the reserve airline staffing level for a first day and the varying the risk variable associated with the second day are accomplished with a fixed number of reserve airline staff members.

15. A method for reserve planning for airline staffing, the method comprising:
forecasting, by a reserve forecasting system, a predicted daily reserve airline staff demand level for each day in a first time period, wherein the predicted daily reserve airline staff demand level for each day is generated based on the mean and standard deviation of historical reserve airline staff demand level for that day;
storing, by the reserve forecasting system, the predicted daily reserve airline staff demand level in a database;
tuning, by the reserve forecasting system, the database to optimize database performance;
wherein the tuning includes placing frequently used files on separate file systems to reduce in and out bottlenecks;
designating, by the reserve forecasting system, the predicted daily reserve airline staff demand level as a key field in a plurality of related data tables to speed searching for data;
linking, by the reserve forecasting system, the plurality of related data tables based on a type of predicted daily reserve airline staff demand level in the key fields;
sorting, by the reserve forecasting system, the predicted daily reserve airline staff demand level according to a known order to simplify a lookup process;
obtaining, by the reserve forecasting system, the predicted daily reserve airline staff demand level from the database;
optimizing, by the reserve forecasting system, a risk-based solution to meet the predicted daily reserve airline staff demand level for each day in the first time period,
wherein a software crew planning system implements the risk-based solution by assigning airline staff members to on-duty days and reserve days, and
wherein the airline implements the risk-based solution by staffing an airline flight with an airline staff member assigned to a reserve day in place of an airline staff member assigned to an on-duty day;
evaluating, by the reserve forecasting system, the performance of the risk-based solution against an actual daily reserve airline staff demand level for each day in the first time period; and
utilizing, by the reserve forecasting system, the performance of the risk-based solution during the first time period to create a predicted daily reserve airline staff demand level for each day in a second time period,
wherein the forecasting utilizes a probabilistic reserve staffing model formulated as:

$$\min \text{Cost} = \sum_{j \in P} C_j x_j + \sum_{t \in T} C'_t (1 - \alpha_t)$$

subject to $$\sum_{j \in P} A_{jt} x_j - F^{-1}(1 - \alpha_t) \geq 0 \quad \forall\, t \in T$$

$$\alpha_t \geq \alpha_{min} \quad \forall\, t \in$$

and $$x_j \begin{cases} 1 \text{ if pattern } j \text{ is included in the solution} \\ 0 \text{ otherwise} \end{cases}$$

$$\forall\, j \in P$$

where:
$\alpha_t$ represents a minimum probability that a selected reserve pattern will exceed the predicted daily reserve airline staff demand level, $C_j$ represents a financial cost of selecting reserve pattern j as part of a selected solution, $C'_t$ represents a financial cost of having insufficient reserve crews to cover a scheduled set of airline flights in the first time period, t represents a day in the first time period, $x_j$ represents a binary decision variable to include reserve pattern j as part of a selected solution, $A_{jt}$ represents a mapping coefficient configured to relate a reserve pattern j to the corresponding day t in the first time period, and $F^{-1}(1-\alpha_t)$ represents a nonlinear variable.

16. The method of claim 15, wherein the forecasting comprises:

preparing, by the reserve forecasting system, a subset of historical open duty periods (ODPs) and block time data based on specified filters;

assigning, by the reserve forecasting system, a plurality of indicator variables to each day in the first time period, wherein at least two of the plurality of indicator variables are configured with a dominant relationship;

fitting, by the reserve forecasting system, a linear regression model of ODP as a function of the block time data and the plurality of indicator variables, wherein the results of the linear regression model comprise the coefficients for the block time data and for each indicator variable; and utilizing, by the reserve forecasting system, the linear regression model to estimate the mean and standard deviation of each of the open duty periods.

* * * * *

UNITED STATES PATENT AND TRADEMARK OFFICE
CERTIFICATE OF CORRECTION

PATENT NO. : 10,102,487 B2
APPLICATION NO. : 13/793049
DATED : October 16, 2018
INVENTOR(S) : Timothy L. Jacobs et al.

It is certified that error appears in the above-identified patent and that said Letters Patent is hereby corrected as shown below:

In the Claims

In Column 26, Line 10 Claim 1 delete:
" $x_j \begin{cases} 1 \text{ if pattern } j \text{ is included in the solution} \\ 0 \text{ otherwise} \end{cases}$ "

And therefore insert:
-- $x_j = \begin{cases} 1 \text{ if pattern } j \text{ is included in the solution} \\ 0 \text{ otherwise} \end{cases}$ --

In Column 28, Line 60 Claim 15 delete:
" $x_j \begin{cases} 1 \text{ if pattern } j \text{ is included in the solution} \\ 0 \text{ otherwise} \end{cases}$ "

And therefore insert:
-- $x_j = \begin{cases} 1 \text{ if pattern } j \text{ is included in the solution} \\ 0 \text{ otherwise} \end{cases}$ --

Signed and Sealed this
Fourth Day of December, 2018

Andrei Iancu
*Director of the United States Patent and Trademark Office*